United States Patent [19]

Wiesemann

[11] Patent Number: 5,798,039
[45] Date of Patent: Aug. 25, 1998

[54] DRUM FILTER SYSTEM WITH REMOVABLE FILTER ELEMENTS AND A PAWL ROTATION MECHANISM

[76] Inventor: Fred E. Wiesemann, 10370 Longwood Dr., Bardmoor, Largo, Fla. 34647

[21] Appl. No.: 797,089

[22] Filed: Feb. 7, 1997

[51] Int. Cl.⁶ .................................................. B01D 33/06
[52] U.S. Cl. .......................... 210/232; 210/394; 210/400; 210/402; 210/403; 210/404; 210/411
[58] Field of Search ........................ 210/232, 391, 210/393, 394, 400, 402, 403, 404, 407, 409, 411

[56] References Cited

U.S. PATENT DOCUMENTS

| | | |
|---|---|---|
| 478,093 | 7/1892 | Derham . |
| 691,030 | 1/1902 | Wernecke . |
| 869,720 | 10/1907 | Matthias . |
| 2,259,235 | 10/1941 | Weiss . |
| 2,663,432 | 12/1953 | Johansen . |
| 2,724,507 | 11/1955 | Cataldo . |
| 2,793,755 | 5/1957 | Richards . |
| 3,175,691 | 3/1965 | Watson . |
| 3,353,675 | 11/1967 | Glos . |
| 3,517,818 | 6/1970 | Luthi . |
| 3,794,178 | 2/1974 | Luthi . |
| 3,843,520 | 10/1974 | Bottorf . |
| 4,670,143 | 6/1987 | Bratten . |
| 4,812,231 | 3/1989 | Wiesemann . |
| 4,921,602 | 5/1990 | Fröderberg et al. . |
| 5,102,536 | 4/1992 | Wiesemann . |

*Primary Examiner*—Robert Popovics
*Attorney, Agent, or Firm*—Larson & Larson, P.A.; Herbert W. Larson

[57] ABSTRACT

A drum filter system includes a tank in which a rotary drum is disposed with liquid to be filtered entering inside the drum and exiting peripherally of the drum. The drum consists of a plurality of individual filter elements that are removable in a direction parallel to the axis of rotation of the drum. Each filter element is mounted using a unique mounting bracket assembly. A backwashing sub-system is provided that allows backwashing of individual filter elements as they are indexed into alignment with the backwashing sub-system. A conveyor conveys material removed from the filter elements by the backwashing sub-system to a point of discharge.

18 Claims, 13 Drawing Sheets

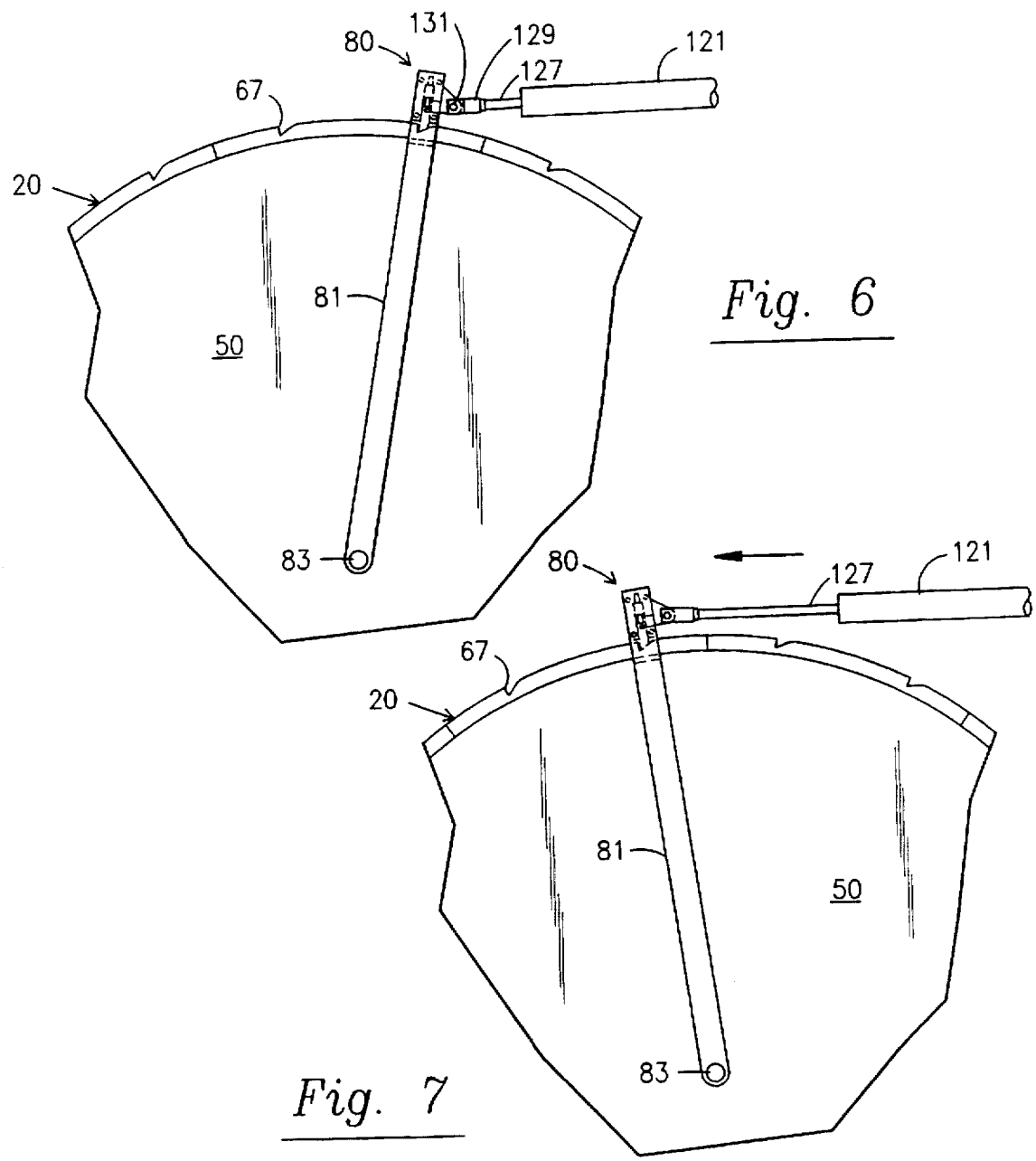

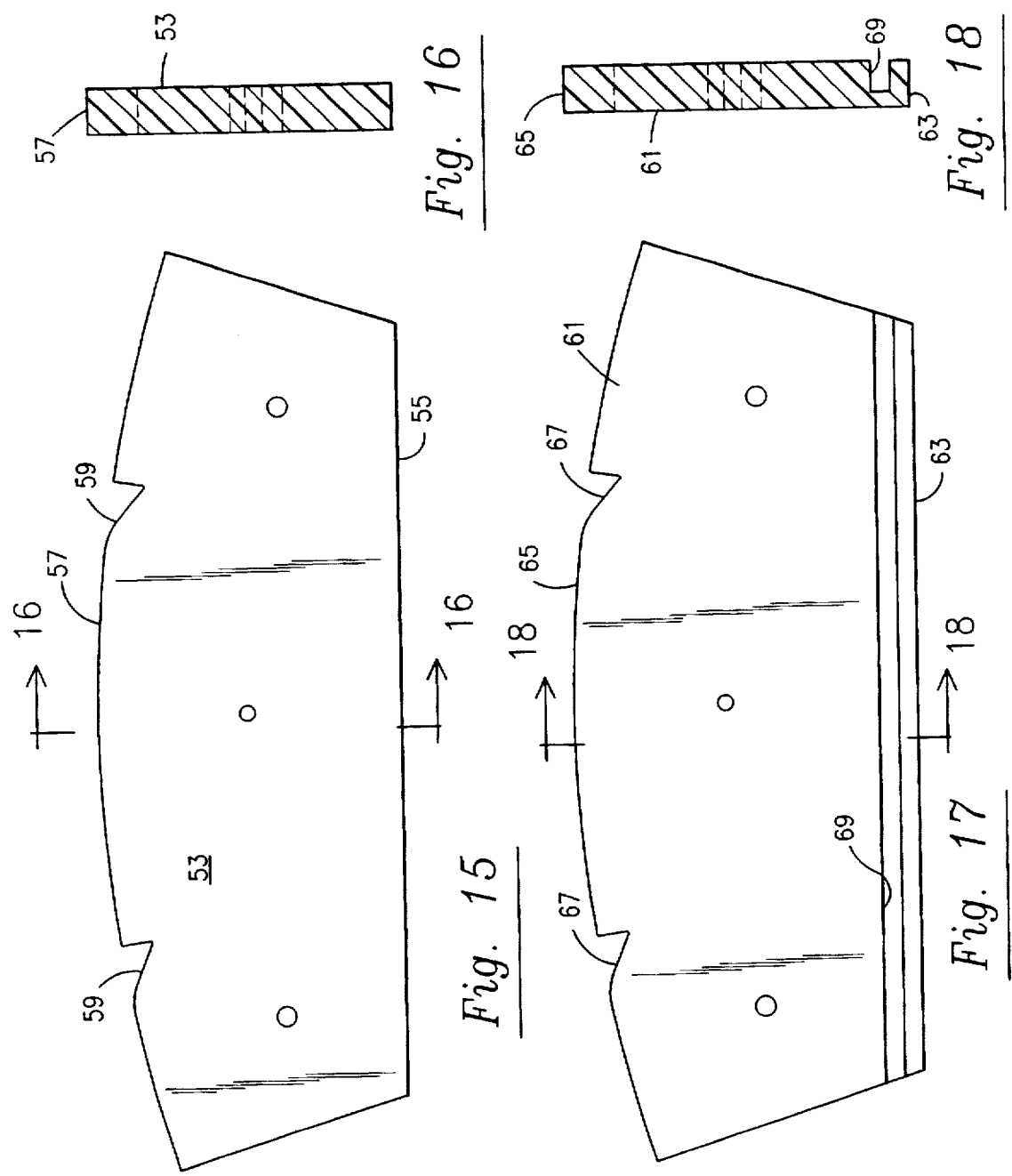

5,798,039

1

DRUM FILTER SYSTEM WITH REMOVABLE FILTER ELEMENTS AND A PAWL ROTATION MECHANISM

BACKGROUND OF THE INVENTION

The present invention relates to a drum filter system with removable filter elements. In the prior art, drum-type filter systems are known. However, applicant is unaware of any such system including applicant's manner of mounting removable screens and other aspects of the present invention.

The following prior art is known to Applicant:

U.S. Pat. No. 478,093 to Derham
U.S. Pat. No. 2,259,235 to Weiss
U.S. Pat. No. 2,724,507 to Cataldo
U.S. Pat. No. 2,793,755 to Richards
U.S. Pat. No. 3,353,675 to Glos II
U.S. Pat. No. 3,517,818 to Luthi
U.S. Pat. No. 3,794,178 to Luthi
U.S. Pat. No. 3,843,520 to Bottorf
U.S. Pat. No. 4,812,231 to Wiesemann
U.S. Pat. No. 5,102,536 to Wiesemann While these references teach drum-type filter elements some with removable filter elements, none of these references teaches, alone or in combination with other references, all of the features and aspects of Applicant's unique filter element mounting brackets nor other features and aspects of the present invention as will be described in greater detail hereinafter.

SUMMARY OF THE INVENTION

The present invention relates to a drum filter system with removable filter elements. The present invention includes the following interrelated objects, aspects and features:

(1) In a first aspect, the inventive drum filter system includes a tank having an inlet and an outlet. A filter drum is rotatably disposed within the tank with its axis of rotation angled with respect to the horizontal to enhance proper water flow therethrough.

(2) An intermittently operable mechanism is provided to allow rotation of the filter drum about its axis of rotation. This mechanism consists of a piston and cylinder with the piston rod carrying an indexing pawl selectively engageable with spaced recesses about the periphery of the filter drum to allow successive reciprocations of the piston rod to result in incremental rotations of the filter drum.

(3) A backwashing system is provided that includes a manifold designed to spray water in the reverse direction across one particular filter element when it is indexed into alignment with the manifold so that particles and debris may be removed from the particular filter element. A conveyor is provided aligned below the manifold and particles and debris fall onto the conveyor. Operation of the conveyor conveys these particles and debris to a point of discharge.

(4) Each filter element includes a screen made of variable mesh having openings in the range of 400 mesh per inch to 1,000 microns. This mesh is mounted on a preferably rectangular frame having a peripheral seal consisting of a plurality of concentric protuberances that engage the filter element mounting bracket to seal the filter drum to prevent any fluid from bypassing the filter elements.

As such, it is a first object of the present invention to provide a drum filter system with removable filter elements.

2

It is a further object of the present invention to provide such a system wherein each filter element has a peripheral seal that seals in the mounting bracket therefor to prevent fluid from bypassing the filter element.

It is a still further object of the present invention to provide such a system including a backwashing sub-system allowing cleaning of each filter element as the filter drum is indexed about its axis of rotation.

These and other objects, aspects and features of the present invention will be better understood from the following detailed description of the preferred embodiment when read in conjunction with the appended drawing figures.

BRIEF DESCRIPTION OF THE DRAWINGS

FIG. 6 is a fragmentary view of a first position of a piston rod in the indexing mechanism of the present invention employed to rotate the filter drum.

FIG. 7 is a fragmentary view of a second position of the piston rod as compared to the position thereof illustrated in FIG. 6.

FIG. 15 is a front view of a portion of a front ring of the present invention.

FIG. 16 is a cross-sectional view along the line 16—16 of FIG. 15.

FIG. 17 is a front view of a rear ring of the present invention.

FIG. 18 is a cross-sectional view along the line 18—18 of FIG. 17.

SPECIFIC DESCRIPTION OF THE PREFERRED EMBODIMENT

Figure 3:
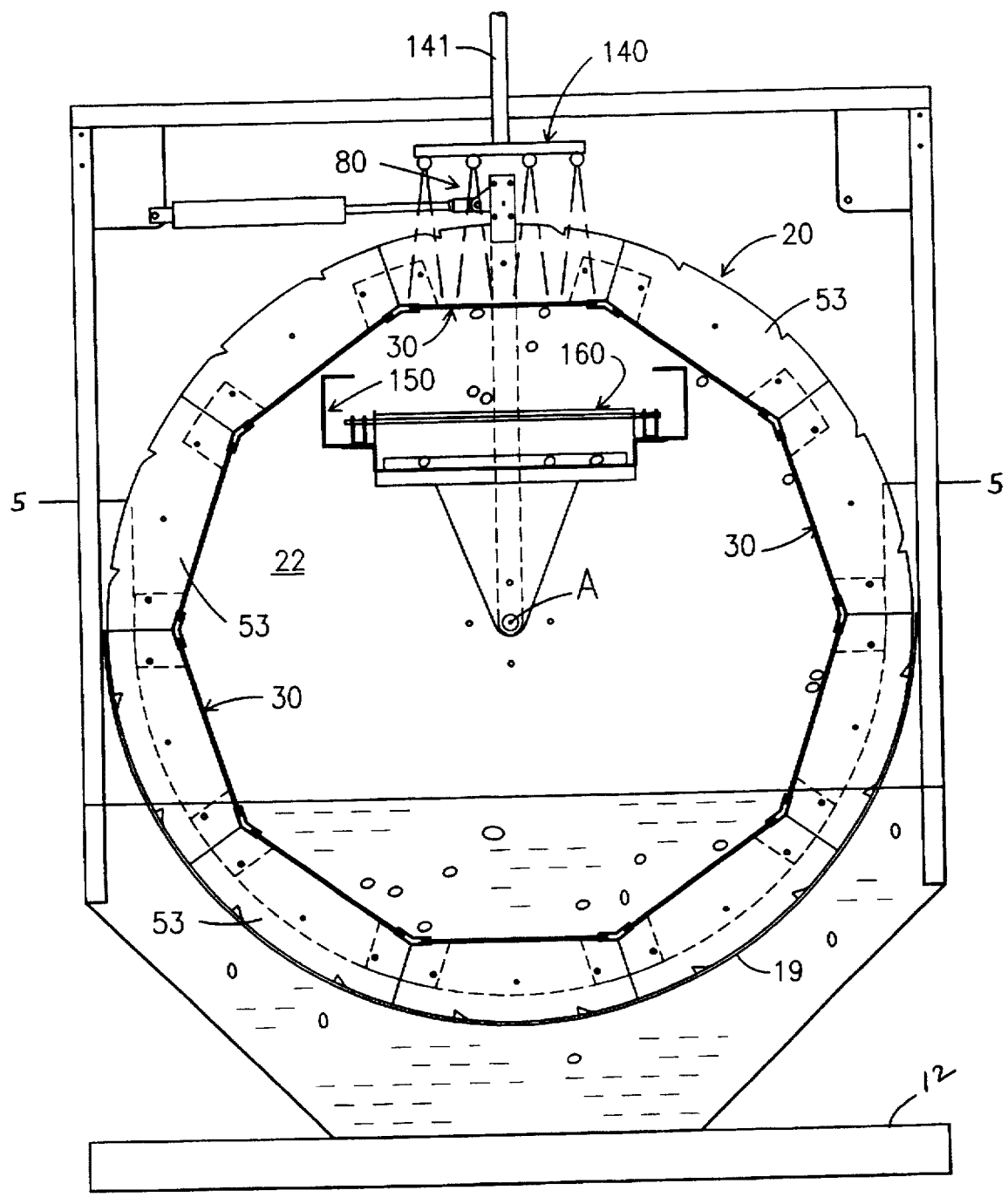
FIG. 3 is a sectional view along line 3—3 in FIG. 1.
Figure 4:
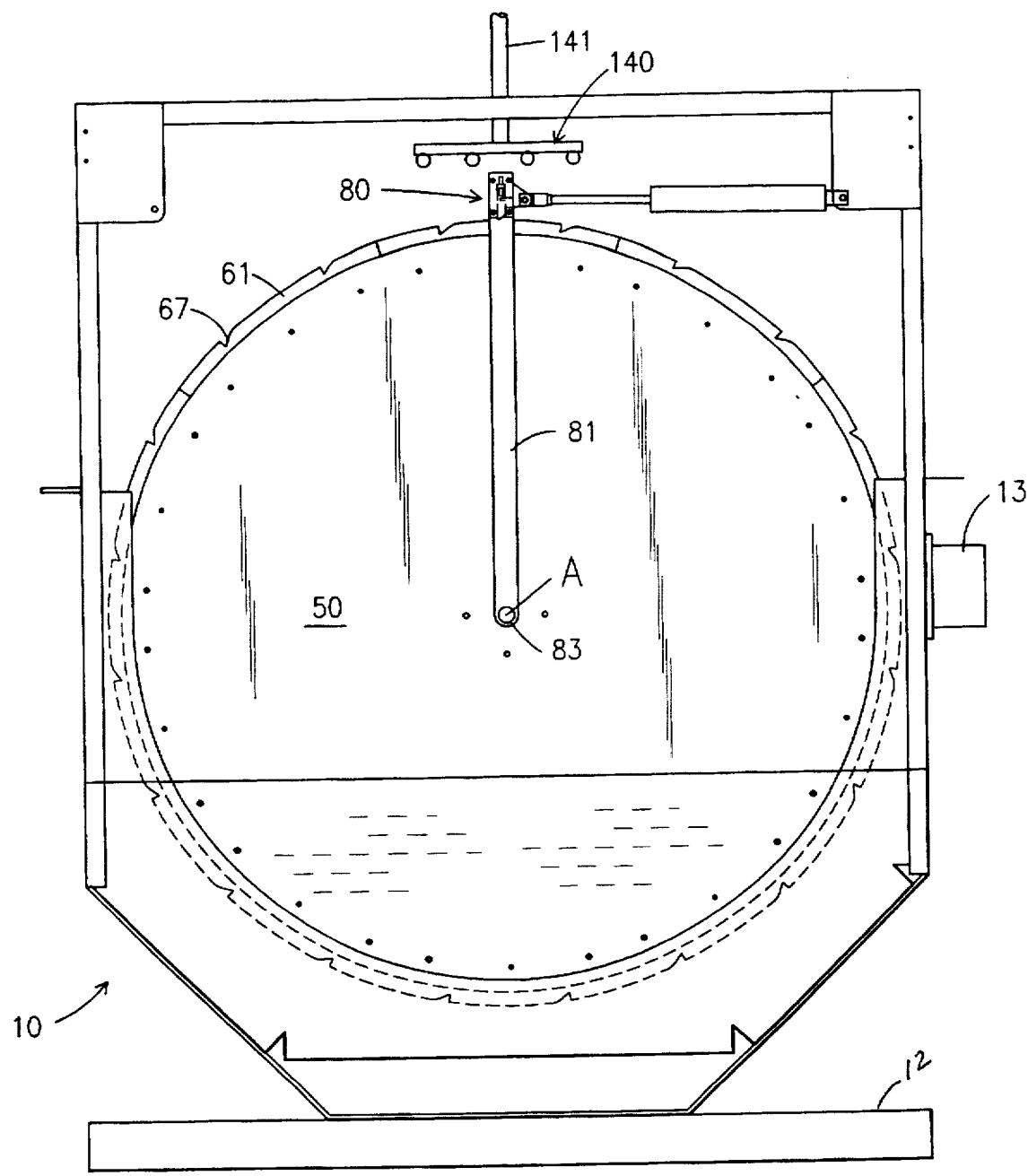
FIG. 4 is a sectional view along line 4—4 in FIG. 1.
Figure 5:
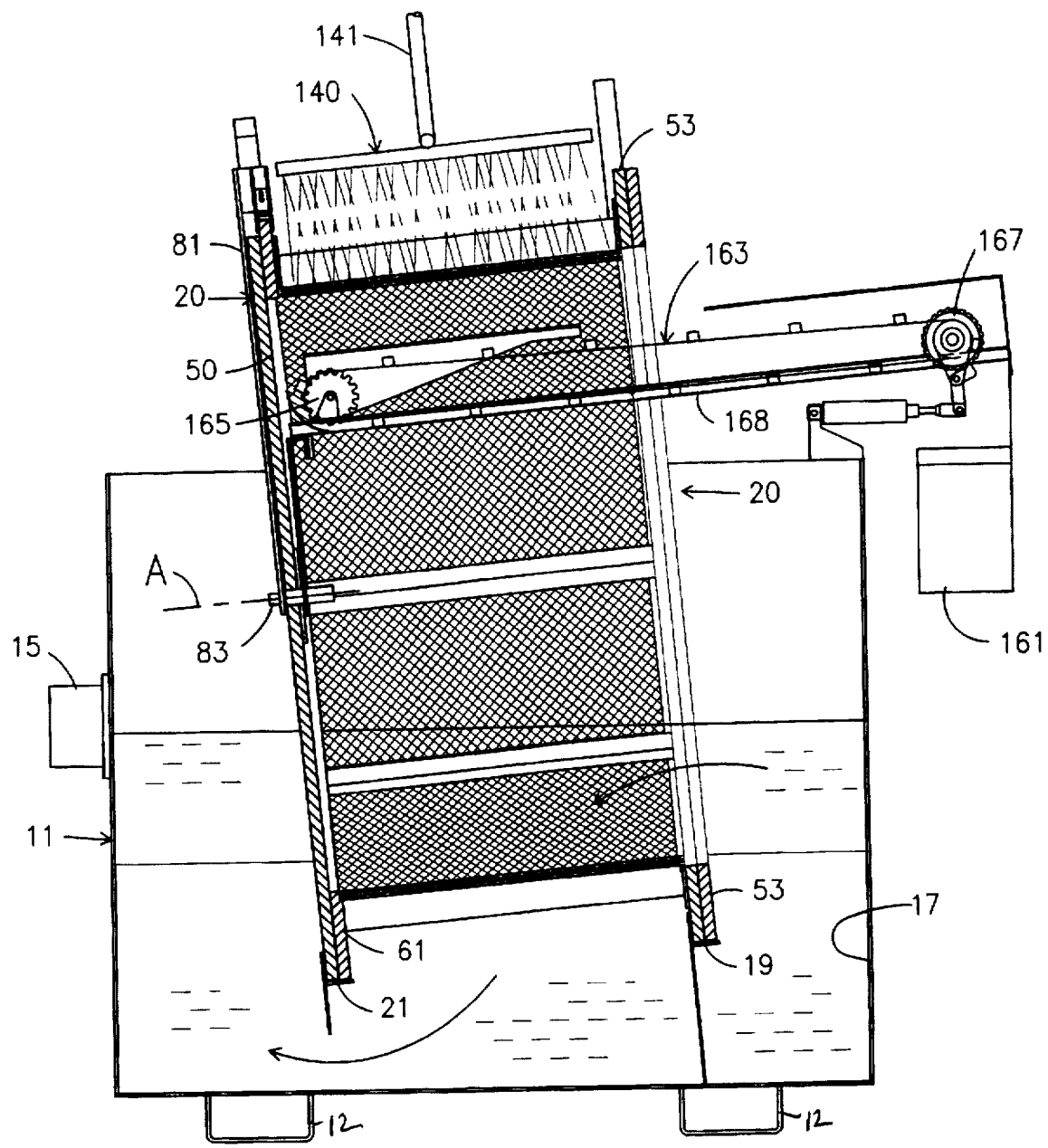
FIG. 5 is a cross-sectional view along the line 5—5 of FIG. 3.

Reference is first made to FIGS. 1–5 wherein the present invention is generally designated by the reference numeral 10, and is seen to include a tank 11 supported by support structure 12. The tank 11 has an inlet 13 and an outlet 15. As best seen in FIG. 5, the tank 11 defines an internal chamber 17 in which are mounted support plates 19 and 21, with the plate 19 being visible in FIG. 3 and with the plates 19 and 21 being arcuate in nature to rotatably support the filter drum that is generally designated by the reference numeral 20.

Figure 1:
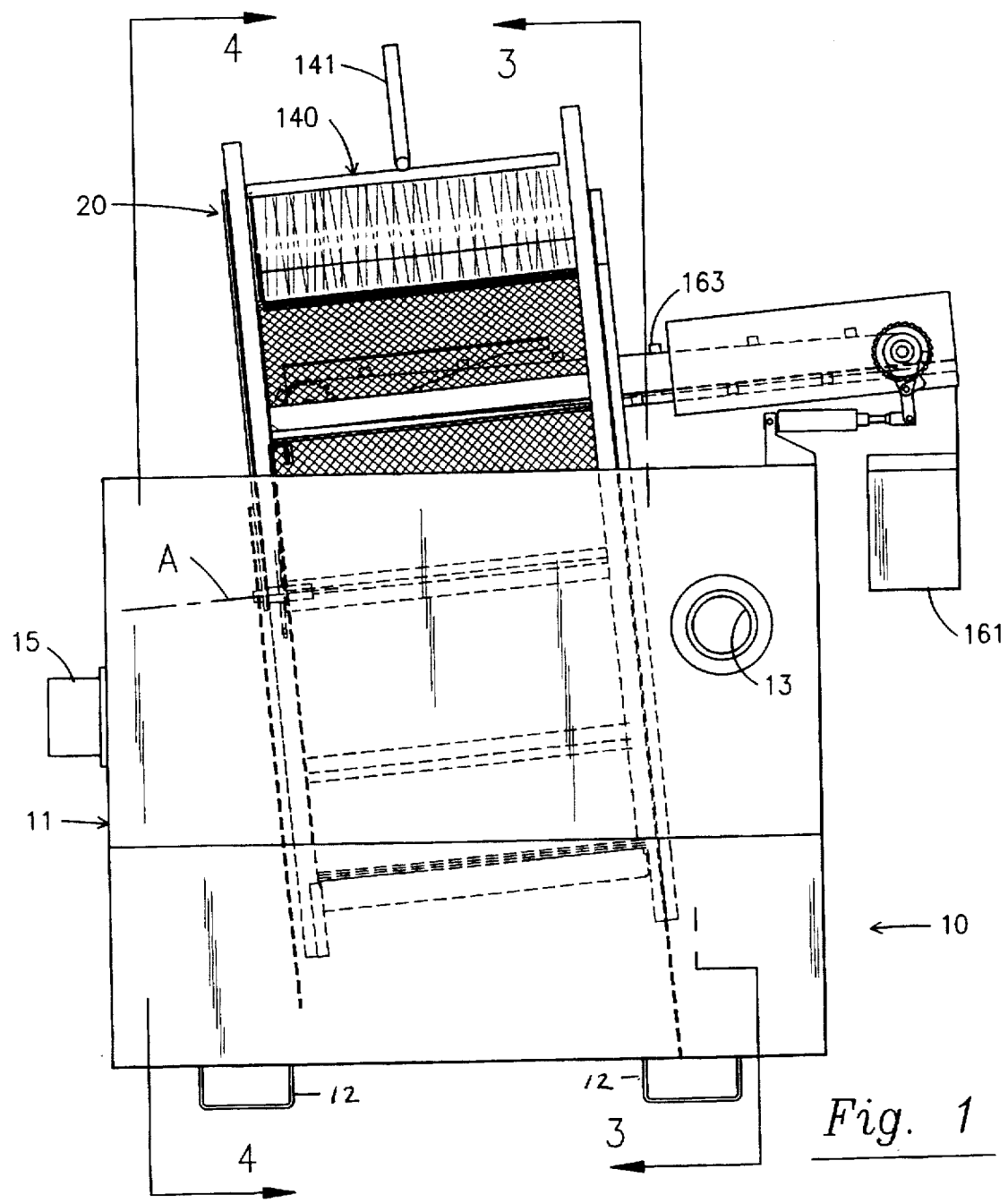
FIG. 1 is a side view of the present invention with certain hidden portions thereof shown in hidden line.

As particularly seen in FIGS. 1 and 5, the axis "A" of rotation of the filter drum 20 is angled with respect to the horizontal to enhance proper flow of fluid through the filter drum 20. In the preferred embodiment, the axis of rotation "A" subtends an angle of 5° with respect to horizontal.

Figure 2:
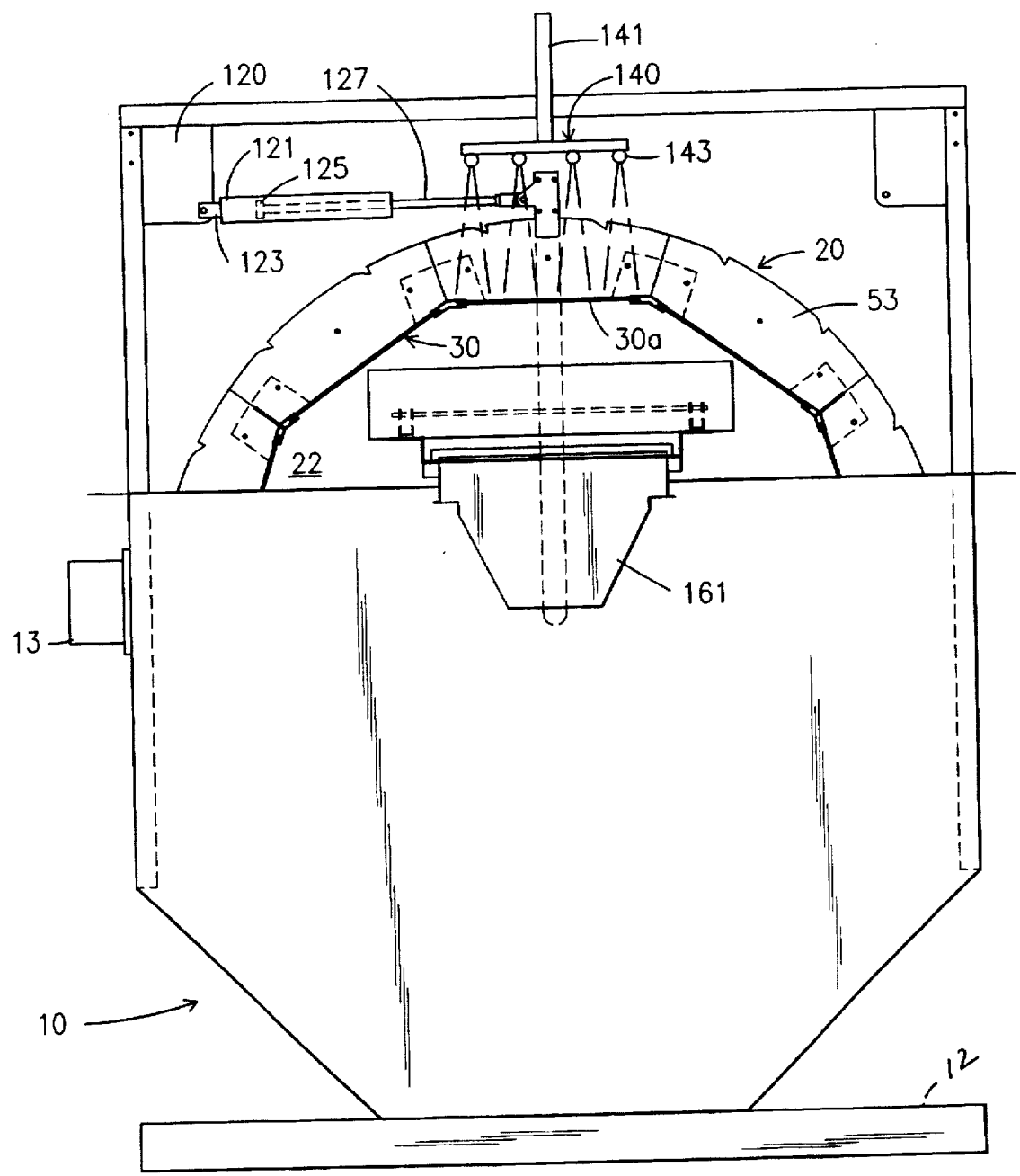
FIG. 2 is a front view of the present invention.

As particularly seen in FIGS. 2 and 3, the filter drum 20 has an open interior 22 and, as should be understood by those skilled in the art, flow of fluid entering the chamber 17 of the tank 11 via the inlet 13 is directed to the interior 22 of the filter drum 20, whereupon the fluid flows through filter elements 30 and thence out the outlet 15.

Figure 12:
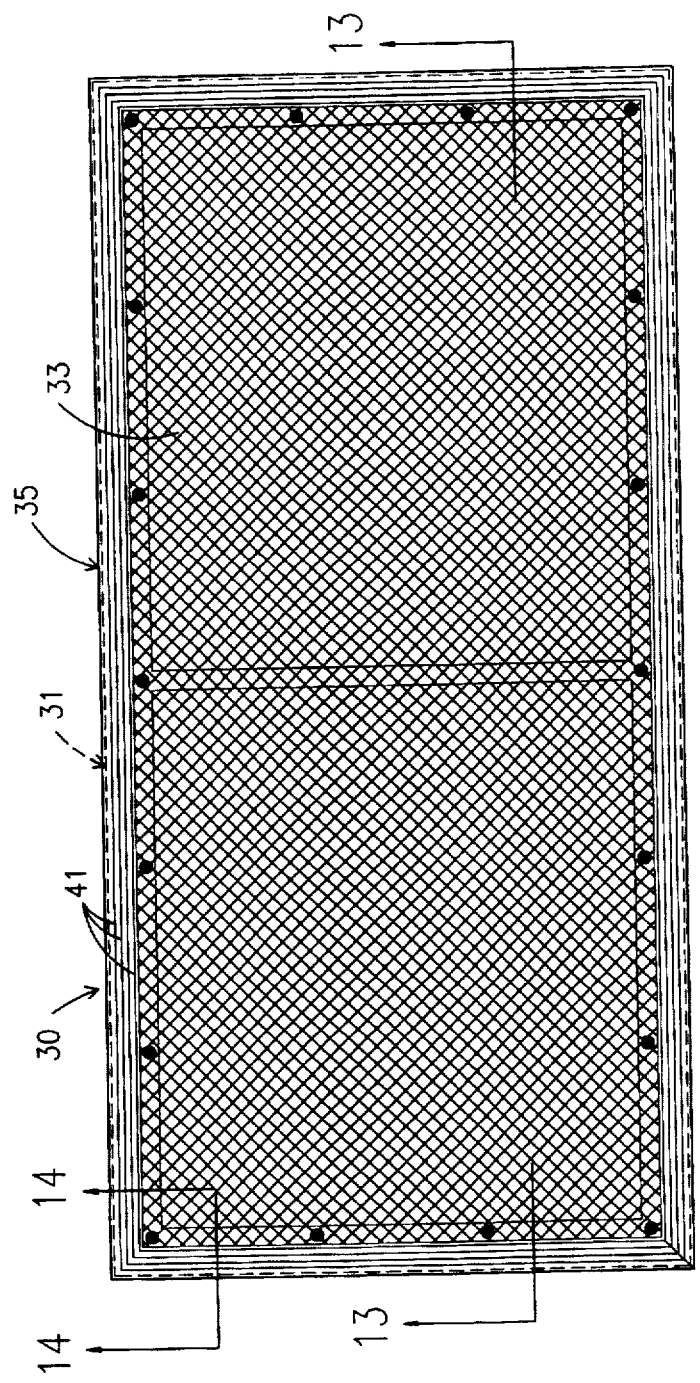
FIG. 12 is a front view of a filter screen assembly.
Figure 13:
FIG. 13 is a cross-sectional view of the filter screen assembly of FIG. 12, along the line 13—13.
Figure 14:
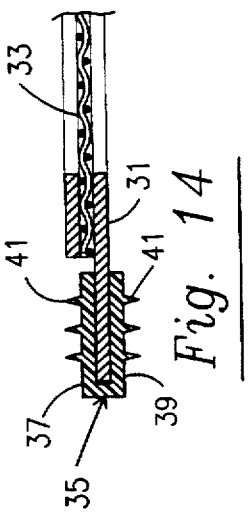
FIG. 14 is a cross-sectional view along the line 14—14 of FIG. 12.

With reference to FIG. 12, each filter element 30 includes an outer frame 31 to which is mounted a variable mesh screen 33 that is designed to filter particles in the range of 400 to 1,000 microns in size. As seen in FIGS. 13 and 14, the frame 31 has mounted thereover a peripheral seal 35 having a U-shaped cross-section with side walls 37 and 39, each of which has a plurality of projecting portions 41 having spike-like cross-sections as shown in FIG. 14. As seen in FIG. 12, these projecting portions 41 comprise a series of concentric protuberances that provide a triple seal on each side of the filter element 30.

As seen from comparing FIGS. 3 and 4, the front of the filter drum 20 is open whereas the rear thereof is closed by a rear plate 50. FIG. 3 shows a series of ring portions 53 mounted about the periphery of the front of the filter drum 20. With reference to FIGS. 15 and 16, each ring portion 53 includes a flat lower wall 55 and an arcuate upper wall 57 having spaced generally triangular notches 59 therein.

Although not visible in FIG. 4, FIG. 5 shows, in cross-section, rear ring portions 61 that are hidden behind the rear plate 50, and one of which is depicted in greater detail in FIGS. 17 and 18. As seen therein, the rear ring portion 61 includes a flat bottom surface 63 and an arcuate top surface 65 having spaced generally triangularly shaped notches 67 therein for a purpose to be described in greater detail hereinafter. Adjacent the bottom surface 63 of the rear ring portion 61, an elongated groove 69 is provided that is also seen in the cross-sectional view of FIG. 18. The groove 69 is sized and configured to receive an end surface of a filter element 30 when the filter element is installed on the filter drum 20.

Figure 19:
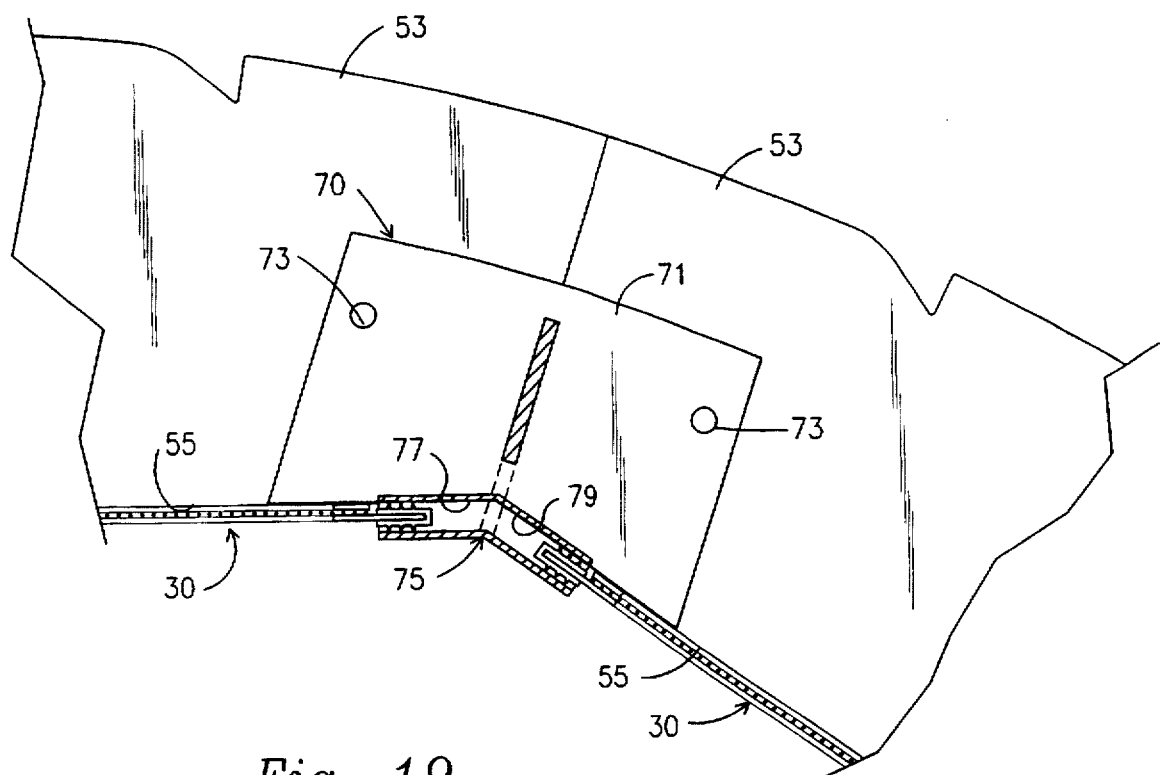
FIG. 19 is an enlarged cross-sectional view of a portion of the filter drum assembly showing the installation of filter elements therein.

In this regard, reference is made to FIG. 19 which shows adjacent front ring portions 53 assembled together through the use of a T-frame 70 having a flat plate 71 with openings 73 therethrough allowing fasteners to be employed to fasten to adjacent front ring portions 53, and a V-shaped portion 75 extending perpendicularly from the plate 71 and including angularly related recesses 77 and 79, that receive respective edges of adjacent filter elements 30. As should be understood from FIGS. 12–19, a filter element 30 is inserted under the bottom surface 55 of the front ring portion 53 as guided by recesses 77 or 79 and is slid perpendicularly to the plane of the front ring portion 53 in a rearward direction until a rear surface of the filter element 30 enters the groove 69 of the rear ring portion 61 whereupon the concentric protuberances 41 (FIG. 14) seal the entire periphery of the filter element 30 through engagement with the recesses 77, 79, the surfaces 55 and 63, and the surfaces of the groove 69.

Figure 21:
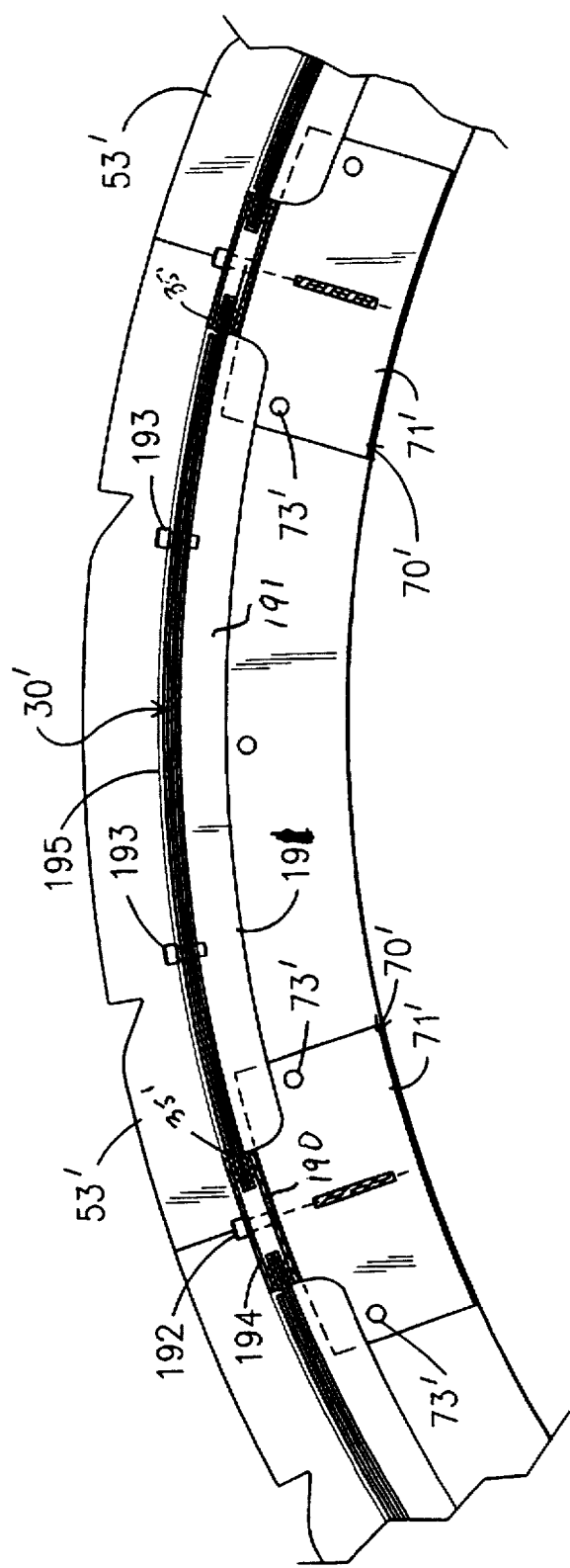
FIG. 21 is a cross-sectional view of a portion of the filter drum assembly showing an alternate installation of the filter element therein.

An alternate manner of retaining filter element 30' in place is seen in FIG. 21. The ring portions 53' are assembled together through the use of T-frame 70' having a flat plate 71' with openings 73' therethrough allowing fasteners to be employed to fasten to the adjacent ring portions 53'. The filter element 30' is mounted over T-frame 70'.

Clamp plate 190 is welded to the T-frame 70'. Attached to clamp plate 190 is a frame mounting member 191 which supports part of the filter element 30'. A clamp plate 194 is placed over an end of the filter element 30' and held in place by bolt 192. Another clamp plate 195 holds the filter element 30' in place with bolts 193. Seals 35' prevents water leakage from the edges of the filter element 30'.

As explained above, the filter drum 20 is mounted on arcuate support plates 19 and 21 for rotation within the chamber 17. In this regard, with reference to FIGS. 6–9, in particular, it is seen that the rotation mechanism or actuating means is generally designated by the reference numeral 80 and is seen to include a rear arm 81 pivotably mounted at the pivot 83 that coincides with the axis "A" of rotation of the filter drum 20. The arm 81 extends radially outwardly beyond the circumference of the filter drum 20 and has mounted thereto a pawl assembly 85, best seen, with reference to FIG. 9. As shown therein, the pawl assembly 85 includes a spacer 87 mounted to the end 82 of the arm 81 through the use of fasteners 84 extending through openings 86 in the arm 81 and then through openings 88 in the spacer 87. The fasteners 84 also extend through openings 90 in a plate 89, through openings 92 in a spacer 91, and through openings 94 of a further metal plate 93, whereupon they are retained in position by suitable means such as, for example, threaded nuts 95.

Figures 8, 9:
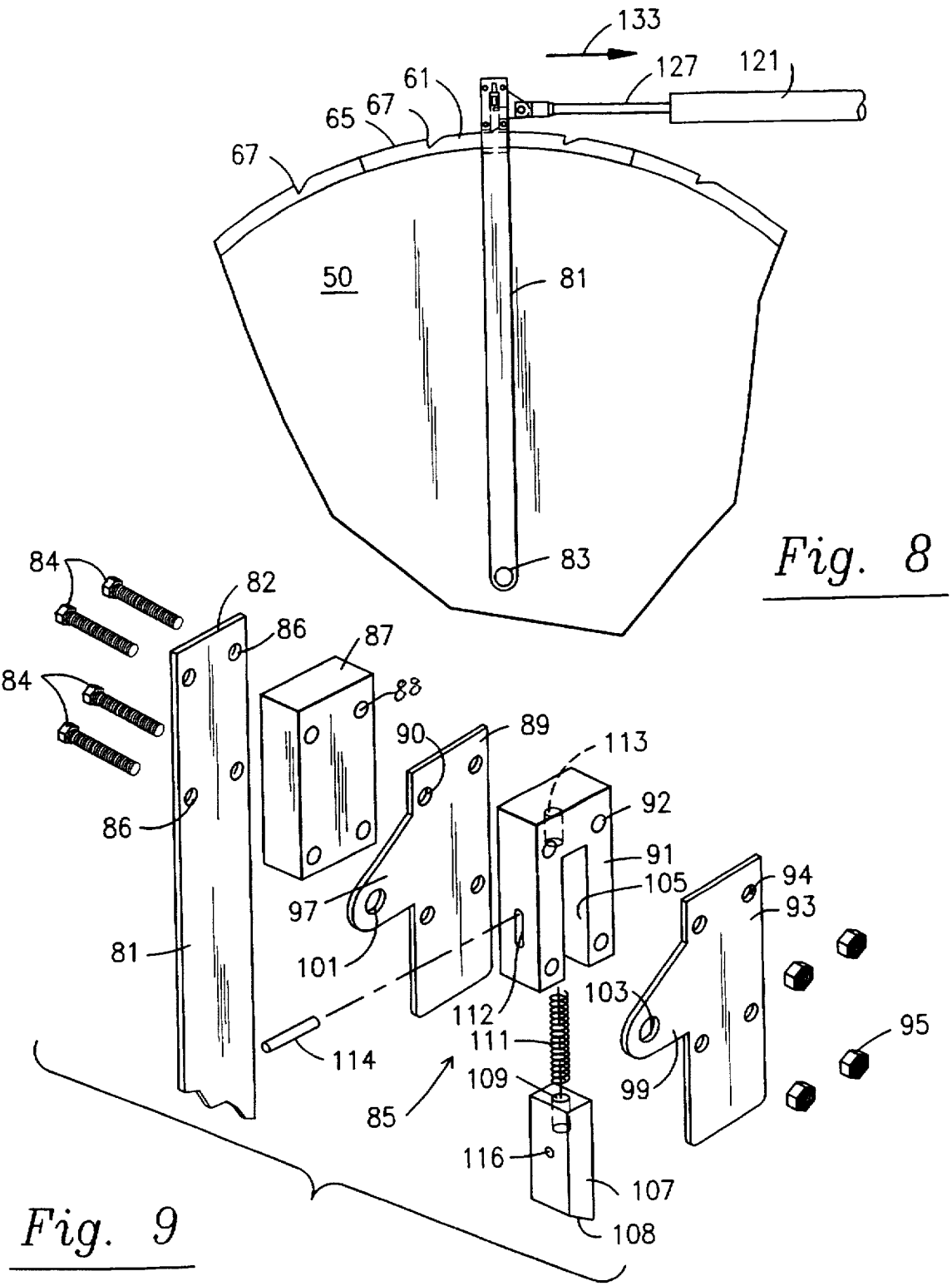
FIG. 8 is a fragmentary view of the piston rod retracting so that the associated pawl can engage the next indentation in the filter drum periphery.
FIG. 9 is an exploded perspective view of pertinent portions of the indexing mechanism.

With further reference to FIG. 9, it is seen that the plates 89 and 93 have respective tongue-like extensions 97 and 99 having respective openings 101 and 103 for a purpose to be described in greater detail hereinafter. Furthermore, the spacer 91 has a recess 105 therein that slidably receives a pawl 107 having a compression spring 111 partially received within a recess 109 therein and also having the other end thereof partially received within a recess 113 in the spacer 91, which recess 113 is shown in phantom in FIG. 9. Thus, the pawl 107 is biased in the downward direction in the view of FIG. 9. The pawl 107 has an angled bottom surface 108 for a purpose to be described in greater detail hereinafter. Additionally, the spacer 91 has a slot 112 therethrough, through which a pin 114 may extend to be inserted within an opening 116 in the pawl 107. The slot 112 limits reciprocations of the pawl 107 to the linear extent of the slot 112.

In the preferred embodiment, the spacers 87 and 91 may be made of any suitable material such as, for example, a plastic material known by the Trademark "DELRIN".

With reference back to FIGS. 2–4, it is seen that the tank 11 has a mounting plate 120 to which is affixed a cylinder 121 via the bracket 123 and any suitable fastening means. A piston 125 (FIG. 2) reciprocates within the cylinder 121 and has attached thereto a piston rod 127. The cylinder 121 may be connected to a suitable source (not shown) of pneumatic pressure. The piston 125 may be caused to reciprocate back and forth in any suitable manner. For example, a spring may be disposed on one side of the piston 125 with pressurized air provided to the other side thereof so that when pressurized air is applied thereto, the piston reciprocates and when air pressure is released, the spring moves the piston back to its initial position. Alternatively, a four-port reversing valve may be interposed between the source of air pressure and the cylinder 121 in a manner well known to those skilled in the art. Suffice to say that, as should be understood by those skilled in the art, when air pressure is supplied to the cylinder 121, the piston 125 is caused to reciprocate back and forth at a frequency of reciprocation that may be suitably controlled, also in a manner well known to those skilled in the art.

As best seen in FIGS. 6 and 7, the piston rod 127 has a distal end having a fitting 129 having an opening 131 therethrough that may be aligned between the openings 101, 103 of the plates 89, 93, whereupon a pin (not shown) may be installed to couple the piston rod 127 to the plates 89 and 93.

As explained above with reference to FIGS. 17 and 18, the rear ring portions 61 have spaced generally triangularly shaped notches 67 in their peripheral surfaces 65. These surfaces are also seen in FIGS. 6, 7 and 8. Thus, it should be understood that when the piston rod 127 is being retracted within the cylinder 121 in the direction of the arrow 133 (FIG. 8), the pawl 107 has left the most adjacent notch 67 and is sliding over the surface 65 of the rear ring portion 61. When the piston rod 127 has retracted to a sufficient degree, the angled bottom surface 108 of the pawl 107 will enter the next adjacent notch 67 as seen in FIG. 6. Subsequently, with reference to FIG. 7, extension of the piston rod 127 with the pawl 107 within the notch 67 causes an incremental rotation of the filter drum 20. As should be understood, successive reciprocations, in and out, of the piston rod 127 will result in successive incremental rotations of the filter drum 20.

With reference back to FIG. 1, it is seen that a backwashing sub-system includes, above the tank 11, a fluid manifold 140 mounted and connected to a source of water via the conduit 141. As seen in FIGS. 2, 3 and 4, the manifold 140 consists of a plurality of manifold portions 143 provided to spray water over the entire surface of one filter element 30 simultaneously. Thus, when a filter element is indexed to the position shown, for example, in FIG. 2 for the filter element 30a, the filter element 30a may be backwashed by water flowing from the manifold 140 to clean the filter element 30a. As successive filter elements 30 are indexed into a position corresponding to that which is depicted for the filter element 30a in FIG. 2, these filter elements 30 are also suitably backwashed. As seen in FIG. 3, an enclosure 150 is provided beneath the manifold 140 and encloses a conveyor system 160 that is designed to convey debris and other particles backwashed from each filter element 30 to a point of discharge. FIG. 2 shows the discharge chute 161 that is spaced from the interior 22 of the filter drum 20. FIG. 5 shows the discharge chute 161 is located outside of the tank 11. FIG. 5 also shows the conveyor belt 163 that is mounted between two wheels 165 and 167.

Figure 10:
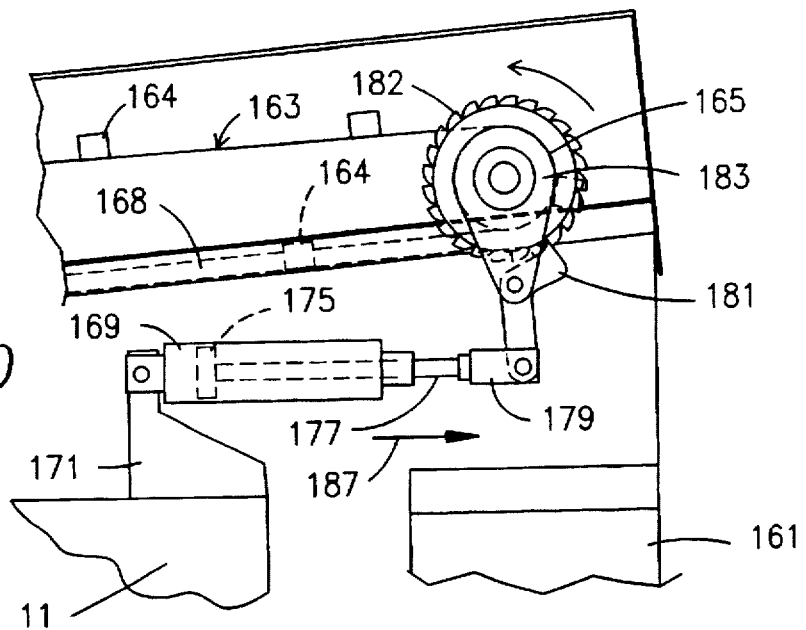
FIG. 10 is a side view of the conveyor mechanism of the present invention in one position of the piston rod thereof.
Figure 11:
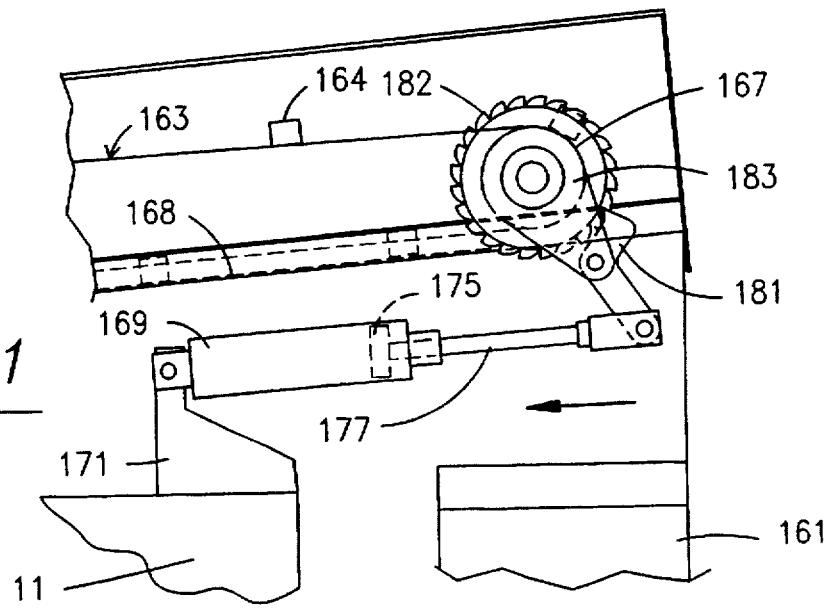
FIG. 11 is a view similar to that of FIG. 10 but with the piston rod and associated parts in a second orientation.

With reference to FIGS. 10 and 11, the drive mechanism for the conveyor 163 is seen to include a cylinder 169 mounted on a bracket 171 affixed to the tank 11. The cylinder contains a piston 175 coupled to a piston rod 177 having a fitting 179 connected to the arm 181 that is affixed to the rotating guide plate 183. As should be understood by those skilled in the art, when the piston rod 177 is extended in the direction of the arrow 185 in FIG. 10, the arm 181 engages ratcheting gear 182 and causes movement of the conveyor belt 163. When the piston is retracted toward the position shown in FIG. 10, the arm 181 disengages from gear 182 and the conveyor belt remains in repose awaiting the next extension cycle of the piston 175. Successive reciprocations of the piston 175 within the cylinder 169 cause successive incremental movements of the conveyor belt 163. In the same manner as explained hereinabove concerning the cylinder 121 and piston 125, the piston 175 and cylinder 169 may be suitably connected to any source of pneumatic pressure and may be operated in the manner explained concerning the cylinder 121 and piston 125.

Figure 20:
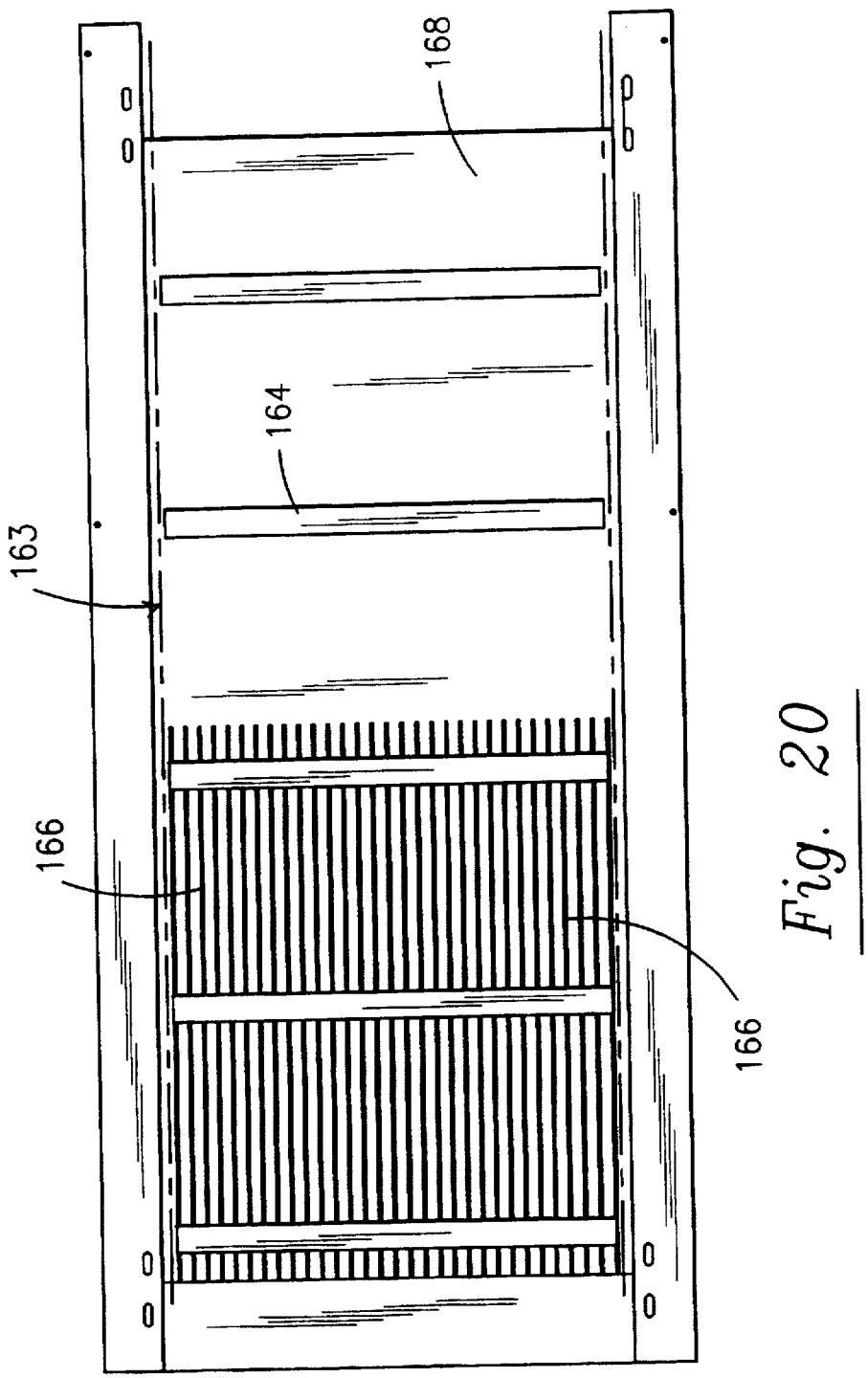
FIG. 20 is a top view of the conveyor mechanism of the present invention.

FIG. 20 shows the conveyor belt 163 to include a plurality of support bars 164 in drainage channel 168 and perpendicular sieve cuts 166 therethrough that are extremely narrow to allow water to flow therethrough while retaining any debris or other particles.

With the above description having been made, the operation of the inventive system should be self-evident. With the filter elements 30 appropriately mounted within the filter drum 20, fluid to be filtered is caused to flow into the inlet 13, through the interior chamber 22 of the filter drum 20, through the filter elements 30, and thence out the outlet 15 to a point of use. Where the fluid being filtered consists of seawater, the point of use may be a desalinization apparatus. The piston 125 within the cylinder 121 is caused to successively reciprocate at a desired speed to cause incremental rotation of the filter drum 20 so that successive filter elements 30 are aligned with the manifold 140 so that these successive filter elements 30 may be backwashed. Particles and other debris cleaned from the filter elements 30 drop onto the conveyor 163 and are conveyed through operation of the piston 175 within the cylinder 169 until the particles and debris are conveyed through the chute 161 to a disposal container (not shown).

Accordingly, an invention has been disclosed in terms of a preferred embodiment thereof which fulfills each and every one of the objects of the invention as set forth hereinabove and provides a new and useful drum filter system with removable filter elements of great novelty and utility.

Of course, various changes, modifications and alterations in the teachings of the present invention may be contemplated by those skilled in the art without departing from the intended spirit and scope thereof.

As such, it is intended that the present invention only be limited by the terms of the appended claims.

I claim:

1. A filter system with removable filter elements, comprising:
   a) a tank having an inlet and an outlet and a support within said tank;
   b) a filter drum rotatably mounted on said support, said filter drum including a multiplicity of planar filter elements removably mounted thereon, said filter drum including mounting brackets for said filter elements, each mounting bracket including guide slots for adjacent filter elements;
   c) actuating means for controllably rotating said filter drum, said actuating means comprising:
      i) a plurality of notches located about a periphery of said drum in a common plane;
      ii) an arm pivotably mounted in said tank and having a free end to which is mounted a reciprocable pawl;
      iii) a cylinder mounted in said tank and receiving a reciprocable piston having a piston rod attached thereto at one end and to said free end of said arm at another end;
      iv) said arm pivoting such that said pawl moves in said common plane, whereby when said piston moves in a first direction, said pawl indexes into one of said recesses and when said piston moves in a second direction, with said pawl within said one of said notches said drum rotates an incremental distance.

2. The system of claim 1, wherein said drum has a front opening and a rear wall, fluid flowing through said front opening, through said filter elements and out said outlet.

3. The system of claim 1, wherein said drum is mounted on said support for rotation about an axis of rotation angled with respect to horizontal.

4. The system of claim 3, wherein said arm is pivotably mounted in coincidence with said axis of rotation.

5. The system of claim 4, wherein said axis of rotation makes an angle of 5° with respect to horizontal.

6. The system of claim 1, wherein each filter element includes a frame and a screen mounted in said frame.

7. The system of claim 6, wherein said screen is configured to filter particles larger than 400 mesh.

8. The system of claim 1, wherein said frame includes two opposed faces slidable in said guide slots, each face having a peripheral seal thereon.

9. The system of claim 8, wherein said seal comprises a plurality of concentric protuberances.

10. The system of claim 8, wherein said frame is rectangular.

11. The system of claim 1, wherein said notches are generally triangular.

12. The system of claim 1, wherein said tank has mounted thereon a backwashing sub-system, comprising:
   a) a manifold connected to a source of water;
   b) a conveyor below said manifold and extending from within said drum to a location exterior of said tank; and
   c) means for actuating said conveyor to convey backwashed particles away from said drum.

13. The system of claim 12, further including a discharge chute positioned adjacent said tank and under an end of said conveyor remote from said drum.

14. A filter system with removable filter elements, comprising:
   a) a tank having an inlet and an outlet and a support within said tank;
   b) a filter drum rotatably mounted about an axis of rotation on said support at about five degrees angle with respect to horizontal, said filter drum including a multiplicity of planar rectangular filter elements removably mounted thereon, said filter drum including mounting brackets for said filter elements, each mounting bracket including guide slots for adjacent filter elements;
   c) actuating means for controllably rotating said filter drum, said actuating means comprising:
      i) a plurality of triangular notches located about a periphery of said drum in a common plane;
      ii) an arm pivotably mounted in said tank about said axis of rotation and having a free end to which is mounted a reciprocable pawl having a triangular end;
      iii) a cylinder mounted in said tank and receiving a reciprocable piston having a piston rod attached thereto at one end and to said free end of said arm at another end;
      iv) said arm pivoting such that said pawl moves in said common plane, whereby when said piston moves in a first direction, said pawl indexes into one of said notches and when said piston moves in a second direction, with said pawl within said one of said notches said drum rotates an incremental distance;
   d) a backwashing sub-system, comprising:
      i) a manifold connected to a source of water;
      ii) a conveyor below said manifold and extending from within said drum to a location exterior of said tank; and
      iii) means for actuating said conveyor to convey backwashed particles away from said drum.

15. The system of claim 14, wherein said drum has a front opening and a rear wall, fluid flowing through said front opening, through said filter elements and out said outlet.

16. The system of claim 14, wherein each filter element includes a frame and a screen mounted in said frame.

17. The system of claim 16, wherein said frame includes two opposed faces slidable in said guide slots, each face having a peripheral seal thereon.

18. The system of claim 14, further including a discharge chute positioned adjacent said tank and under an end of said conveyor remote from said drum.

* * * * *